US006332327B1

(12) United States Patent
Street et al.

(10) Patent No.: US 6,332,327 B1
(45) Date of Patent: Dec. 25, 2001

(54) DISTRIBUTED INTELLIGENCE CONTROL FOR COMMERCIAL REFRIGERATION

(75) Inventors: Norman E. Street; Ted W. Sunderland, both of O'Fallon; Charles D. Thomas; Doron Shapiro, both of St. Louis; Michael J. D'Anna, Eureka, all of MO (US)

(73) Assignee: Hussmann Corporation, Bridgeton, MO (US)

( * ) Notice: Subject to any disclaimer, the term of this patent is extended or adjusted under 35 U.S.C. 154(b) by 0 days.

(21) Appl. No.: 09/524,939

(22) Filed: Mar. 14, 2000

(51) Int. Cl.$^7$ ........................................................ F25B 49/02
(52) U.S. Cl. .................................. 62/127; 62/129; 236/51
(58) Field of Search ............................... 62/125, 126, 129, 62/127, 175; 236/51, 94; 165/11.1

(56) References Cited

U.S. PATENT DOCUMENTS

| | | |
|---|---|---|
| 3,312,081 | 4/1967 | Berger et al. . |
| 3,527,059 | 9/1970 | Rust et al. . |
| 4,071,078 | 1/1978 | Padden . |
| 4,084,388 | 4/1978 | Nelson .................................. 62/152 |
| 4,152,902 | 5/1979 | Lush . |

(List continued on next page.)

OTHER PUBLICATIONS

AS Interface (ASI) News–"AS–Interface accepted as European Standard", 1 page, available at http://www.as–interface.com/news/en50295.html on Sep. 23, 1999.
AS Interface (ASI) News–"Technical Enhancements Extend AS–Interface Capabilities", 2 page, dated Oct. 28, 1998, available at http://www.as–interface.com/news/en50295.html on Sep. 23, 1999.

Siemens Manual, "Actuator Sensor Interface—System Description", May 1996, Siemens Aktiengesellschaft, Germany, 63 pages.
Siemens Manual, "Actuator–Sensor Interface", 1999, Siemens Energy & Automation, Inc., Batavia, Illinois, 128 pages.
Echelon Corporation–"Introduction to the LonWorks® System" (Version 1.0), Published by Echelon Corporation, Palo Alto, California, 1999, 74 pages.
Michael R. Tennefoss, "Echelon White Paper: Implementing Open, Interoperable Building Control systems", Published by Echelon Corporation, Palo Alto, California, 2000, 14 pages.
American Microsystems, Inc., "A2SITM Advanced AS–Interface IC", Published by American Microsystems, Inc., Pocatello, Idaho, Mar. 2000, 27 pages.

*Primary Examiner*—Harry B. Tanner
(74) *Attorney, Agent, or Firm*—Richard G. Heywood

(57) ABSTRACT

A commercial refrigeration system has a control system which distributes intelligence to increase granularity of the control and simplify wiring, assembly and installation. Compressors of the refrigeration system each have a bus compatible compressor safety and control module including a processor and sensors. All control and safety modules communicate over a single power and communications line with the controller, providing digital transmissions to the controller of measurements taken by the sensors. The information provided may include that the compressor is outside of a specific safety parameter, so that the controller knows not only that a safety parameter has been traversed, but exactly which one. The control and safety modules are capable of executing commands from the controller to cycle the compressors. The control and safety modules preferably contain sufficient intelligence to continue system operation upon failure of the controller. A compressor is also disclosed which has an intelligent control and safety module. The compressor also houses control and safety devices within a hermetically or semi-hermetically sealed shell.

57 Claims, 5 Drawing Sheets

U.S. PATENT DOCUMENTS

| | | |
|---|---|---|
| 4,184,341 | 1/1980 | Friedman . |
| 4,325,223 | 4/1982 | Cantley .................................. 62/126 |
| 4,333,316 * | 6/1982 | Stamp, Jr. et al. ...................... 62/126 |
| 4,384,462 | 5/1983 | Overman et al. . |
| 4,545,210 | 10/1985 | Lord ......................................... 62/77 |
| 4,614,089 | 9/1986 | Dorsey .................................... 62/158 |
| 4,748,820 | 6/1988 | Shaw ....................................... 62/175 |
| 4,811,897 * | 3/1989 | Kobayashi et al. ................. 236/51 X |
| 4,812,997 | 3/1989 | Okochi et al. . |
| 4,829,779 | 5/1989 | Munson et al. ........................ 62/175 |
| 4,842,044 | 6/1989 | Flanders et al. . |
| 4,951,029 | 8/1990 | Severson ............................... 340/506 |
| 4,958,502 | 9/1990 | Satoh et al. ............................ 62/126 |
| 4,967,567 | 11/1990 | Proctor et al. ......................... 62/127 |
| 5,050,397 | 9/1991 | Sugiyama et al. ..................... 62/175 |
| 5,062,278 | 11/1991 | Sugiyama . |
| 5,065,591 | 11/1991 | Shaw . |
| 5,123,256 | 6/1992 | Oltman .................................. 62/175 |
| 5,131,237 | 7/1992 | Valbjern ................................. 62/175 |
| 5,142,877 | 9/1992 | Shimizu ................................. 62/129 |
| 5,231,846 | 8/1993 | Goshaw et al. . |
| 5,249,429 | 10/1993 | Hanson . |
| 5,327,742 | 7/1994 | Duff et al. . |
| 5,448,230 | 9/1995 | Schanker et al. ................ 340/870.03 |
| 5,460,006 | 10/1995 | Torimitsu .............................. 62/127 |
| 5,465,081 | 11/1995 | Todd ............................... 340/825.05 |
| 5,515,693 | 5/1996 | Cahill-O'Brien et al. ............. 62/179 |
| 5,533,347 | 7/1996 | Ott et al. ............................... 62/115 |
| 5,566,879 * | 10/1996 | Longtin ............................. 236/51 X |
| 5,577,390 | 11/1996 | Kaido et al. . |
| 5,586,444 | 12/1996 | Fung ..................................... 62/117 |
| 5,592,824 | 1/1997 | Sogabe et al. . |
| 5,626,027 | 5/1997 | Dormer et al. . |
| 5,630,324 | 5/1997 | Yoshida et al. . |
| 5,647,223 | 7/1997 | Wada et al. . |
| 5,701,482 | 12/1997 | Harrison et al. ..................... 395/675 |
| 5,763,959 | 6/1998 | Chambers . |

* cited by examiner

DISTRIBUTED INTELLIGENCE CONTROL FOR COMMERCIAL REFRIGERATION

BACKGROUND OF THE INVENTION

This invention relates generally to commercial refrigeration and more particularly to a commercial refrigeration system having unique power wiring and distribution of control intelligence features.

Great advances have been made over the last 50 years in all aspects of refrigerated food store merchandisers and coolers and the various commercial systems therefor. Retail food merchandising is conducted to a great degree in large supermarkets, each requiring substantial refrigeration capacity. For example, a 50,000 square foot (4,650 square meter) supermarket may have refrigerated display fixtures and other coolers and preparation rooms requiring an aggregate refrigeration capacity in excess of 80 tons (1,000,000 BTU/hr. or 242,000 kcal/hr.) which may include over 20 tons (60,500 kcal/hr.) of low temperature refrigeration at evaporator temperatures in the range of −35° F. to −5° F. (−37° C. to −21° C.) and over 60 tons (181,500 kcal/hr.) of normal temperature refrigeration at evaporator temperatures in the range of 15° F. to 40° F. (−9° C. to 4° C.). Such present commercial refrigeration systems have a multitude of evaporator cooling coils for the various refrigerated product merchandisers located throughout the supermarket; and these evaporators are typically cooled by several multiplexed low temperature and medium temperature compressor systems. It is also known to use such systems in smaller environments such as convenience stores, or for the preservation of other perishables not related to the food store environment (e.g., blood, plasma, medical supplies).

Conventional practice is to put the refrigeration requirements of a supermarket into two or more multiplexed refrigeration systems; e.g., one for the low temperature refrigeration of frozen foods and ice cream at product temperatures in the range of −20° F. to 0° F. (−29° C. to −18° C.); and another for the normal temperature refrigeration of fresh foods including meat, dairy and produce at product temperatures in the range of 28° F. to 50° F. (−2°C. to 10° C.). Each such system is a closed system having a single condenser/receiver and common discharge suction and liquid distribution headers with parallel circuits of the latter to the respective merchandiser or cooler evaporators and with the various complex valving requirements to balance suction pressures (EPR valves) and to accommodate selective evaporator isolation for gas or other types of defrosting. In any event, the multiplexed compressors of such systems are usually installed in back machine rooms and typically connect to roof top air-cooled condensers, which in turn connect back to the machine room to a receiver and thence to the liquid refrigerant distribution header and various high side valving and liquid line circuit outlets.

The multiplexed compressors in a refrigeration system are typically mounted together on a rack and piped in parallel, each having a low side connected to a suction header and a high side connected to the discharge header. The operation of the compressors is cycled, based on a measured system parameter, to maintain a desired level of refrigeration. Usually, the measured parameter is suction pressure at the suction header. A transducer on the suction header provides a signal to a compressor controller indicating the suction pressure, and the controller compares the measured pressure with a setpoint pressure and turns the compressors off and on accordingly, taking into consideration other factors such as compressor run time. It is also known to adjust system capacity in other ways, such as by changing the speed of an individual compressor motor where the design of the compressor permits. Refrigeration level can also be affected by cycling condenser fans and in other ways not directly pertaining to the compressors.

In addition to the controller, each compressor has a high voltage protection circuit capable of shutting down the compressor when it operates outside any one of a number of predetermined safe operating limits. A high voltage line in a shielded conduit must be brought from the store utility power distribution center to the compressor where the protection circuit is located. The protection circuit normally energizes a compressor control coil to close a compressor contact in series with the compressor power line so that the compressor may run when activated by a relay operated by the controller. Operating limits are typically established for one or more of: motor winding temperature, oil level (or pressure), discharge pressure and phase loss/reversal. The protection circuit has a safety contact wired in series for each operating limit. When a particular operating limit as detected by a corresponding sensor is exceeded, the contact opens causing the control circuit to open, de-energizing the compressor contactor coil and disabling energization of the compressor by the controller.

Existing protection circuits are aware only that the operating limit has been traversed, and have no capability to provide information as to the actual value of the parameter. A separate alarm circuit from the controller to the control circuit is needed so that notification of the problem can be made. In order to know which operating limit was traversed, still more indicator circuits are required between each safety contact and the controller. Thus, a substantial amount of wiring is necessary to connect the compressor to the controller. Even if the protection circuit is so wired for providing maximum information, there are substantial gaps in information concerning the operation of the compressor because of the absence of the ability to give an absolute reading of the parameter measured.

A parallel switchback circuit may be wired in parallel to the controller so that electromechanical control of the compressor can be activated in the event of controller failure. The parallel switchback circuit allows a suction pressure control switch to activate the compressor in the absence of a functioning controller. The switchback circuit provides only crude system control subsequent to controller failure. In order to have such a circuit it will be necessary to install isolation relays to prevent the possibility of control interference from the switchback circuit when the controller is operating normally.

In addition to the control wiring described above, power wiring is also necessary. The compressor is powered by a high voltage, three phase 480V AC or 208V AC line (or various other three phase power sources) and the control circuit is powered by a single phase 120V AC or 208V AC high voltage line. Two high voltage lines must be wired for each compressor; one three phase for the compressor motor and one single phase line for the protection circuit. These lines are required to be shielded, such as by placement in a conduit. Thus, a number of shielded power lines are required for each compressor rack, making existing wiring complex and costly.

Most of the sensors now used for monitoring safety and control parameters for the compressors are located outside of the compressor. Suction pressure monitoring is typically from the suction header, substantially remote from the compressors. Sensors associated with the safety module are located on the compressor. Thus, all of these items are exposed to potential damage during shipping and installation.

SUMMARY OF THE INVENTION

Among the several objects and features of the present invention may be noted the provision of a commercial refrigeration system having distributed intelligence control functions; the provision of such a distributed intelligence control for a refrigeration system which can operate in case of main controller failure; the provision of such a refrigeration system control which is capable of continuously monitoring the status of operating parameters of multiplexed compressors; the provision of such a commercial refrigeration system control which provides substantial information about compressor operating characteristics; the provision of such a refrigeration system control which is easy to assemble and install; the provision of such a refrigeration system control which operates control functions at low voltage; and the provision of such a refrigeration system which has simplified wiring.

Further among the several objects and features of the present invention may be noted the provision of a compressor safety and control module for a commercial refrigeration system which is capable of communicating compressor status information; the provision of such a compressor safety and control module which is capable of monitoring its own compressor's operating parameters; the provision of such a compressor which shields sensors; the provision of such a compressor and compressor safety control module which provides highly accurate operating parameter data; the provision of such a compressor safety control module which can operate in cooperation with other compressor safety control modules if a master controller fails; the provision of such a compressor and compressor safety control module which is easy to wire into a refrigeration system.

Generally, a commercial refrigeration system for use in a food store of the present invention comprises at least one fixture incorporating an evaporator constructed and arranged for cooling food in the fixture. A compressor in fluid communication with the evaporator for drawing refrigerant away from the evaporator is in fluid communication with a condenser for receiving refrigerant from the compressor. The condenser is constructed and arranged for removing heat from the refrigerant. An expansion valve in fluid communication with the condenser for receiving refrigerant from the condenser is constructed and arranged for delivering refrigerant into the evaporator. A compressor operating unit associated with the compressor is constructed and arranged for monitoring at least one operating parameter of the compressor and determining whether the operating parameter is within specification. A power and communication line extends from a master controller to the compressor operating unit and provides electrical power for the operating unit. The controller and compressor operating unit are constructed and arranged for digital communication over the power and communication line such that no separate power line for the operating unit must be wired upon installation of the system.

In another aspect of the present invention, the combination of a food store refrigeration system and controller means for controlling operation of compressor means of the refrigeration system. The system further comprises at least one fixture having evaporator means for cooling the fixture. The compressor means has its suction side connected to draw refrigerant vapor from the evaporator means, and condenser means is connected to the compressor discharge side for receiving high pressure refrigerant from the compressor means. The condenser means is operative for liquefying the refrigerant. Other means constructed and arranged for delivering refrigerant into the evaporator means is also provided. The controller means comprises a compressor control and safety module operatively associated, in use, between the compressor means and the controller means. The compressor control and safety module is constructed and arranged for monitoring at least one operating condition of the compressor means and determining whether it is within a prescribed operating parameter. A power and communication line extending from the controller means to the compressor control and safety module and provides electrical power therefor. The controller means and compressor control and safety module are constructed and arranged for digital communication through said power and communication line whereby no separate power line for the compressor or compressor control and safety module must be used upon installation of the system.

In yet another aspect of the present invention a commercial refrigeration compressor for use in a vapor phase refrigeration system having evaporative cooling means for refrigerating perishable products comprises an outer casing, an electric motor, a pressurizing unit constructed and arranged within the casing to be driven, in use, by the motor for drawing vaporous refrigerant from the cooling means at low pressure and pressurizing the vaporous refrigerant to a higher pressure. An operating unit includes a processor, at least one sensor strategically placed within the casing for monitoring an operating parameter of the compressor. The sensor is in communication with the processor. Switching means is connected to the processor for controlling activation and deactivation of the motor. The processor is configured for transmitting data regarding the sensed operating parameter to a master controller remote from the compressor and for receiving compressor control commands from such master controller and for executing such commands.

A further aspect of the present invention involves a refrigeration compressor for use in a vapor phase refrigeration system having evaporative cooling means for refrigerating perishable products. The compressor comprises an outer casing, an electric motor, a pressurizing unit constructed and arranged within the casing to be driven, in use, by the motor for drawing vaporous refrigerant from the cooling means at low pressure and pressurizing the vaporous refrigerant to a higher pressure, and an operating unit. The operating unit includes a processor, at least one sensor strategically placed within the casing for monitoring an operating parameter of the compressor and in communication with the processor. Switch means connected to the processor controls activation and deactivation of the motor. The processor is constructed and arranged to command the switch means in response to a control evaluation of the sensed operating parameter.

In still another aspect of the present invention, a refrigeration system compressor having an operating unit and plural sensors in combination with a master controller electronically connected to the operating unit. The operating unit comprises means for establishing a sensed digital signal representing the value of a refrigerant operating parameter. Means for holding holds the operating unit in a standard operation mode awaiting command signals from the master controller during a preset time period. Means transmits the digital signal to the master controller upon request therefrom and executing any command signal, if received, to change the refrigerating capacity of the compressor as dictated by the command signal. Means is provided for switching the operating unit into a master controller failure mode if no command signal is received within the preset time period. Means evaluates the sensed signal within the operating unit while in the failure mode and the operating unit assumes independent control of the compressor to change the refrigeration capacity thereof. Sequential time periods for the master controller to resume control and set by means within the operating unit.

In still a further aspect of the present invention, a method of distributed intelligence control of a compressor in a refrigeration system is disclosed. The refrigeration system has a plurality of fixtures. The compressor has a dedicated operating unit constructed and arranged to monitor at least two sensed operating parameters and is electronically dependent upon a master controller in a standard operation mode. The method generally comprises the steps of receiving sensed signals indicative of refrigerant conditions associated with the compressor into the operating unit. At least one sensed signal is converted to a digital signal representing the value of the refrigeration condition, and held the operating unit in the standard operation mode for a preselected time period awaiting a command signal from the master controller. The digital signal in the operating unit is transmitted to the master controller in response to a command signal received therefrom within the preselected time period, and any command signal from the master controller is executed to change the compressor operation. An independent control mode is assumed by the operating unit when the master controller is in a failure mode and sends no command signal to the operating unit within the preselected time period. The operating unit determines: (a) the required compressor operation responsive to the sensed signal and controls the compressor operation accordingly; and then (b) the operating unit waits another set period of time for a command signal from the master controller. Steps (a) and (b) are repeated if no command signal is received within said other set period of time.

These and still other objects and features of the present invention will become more apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
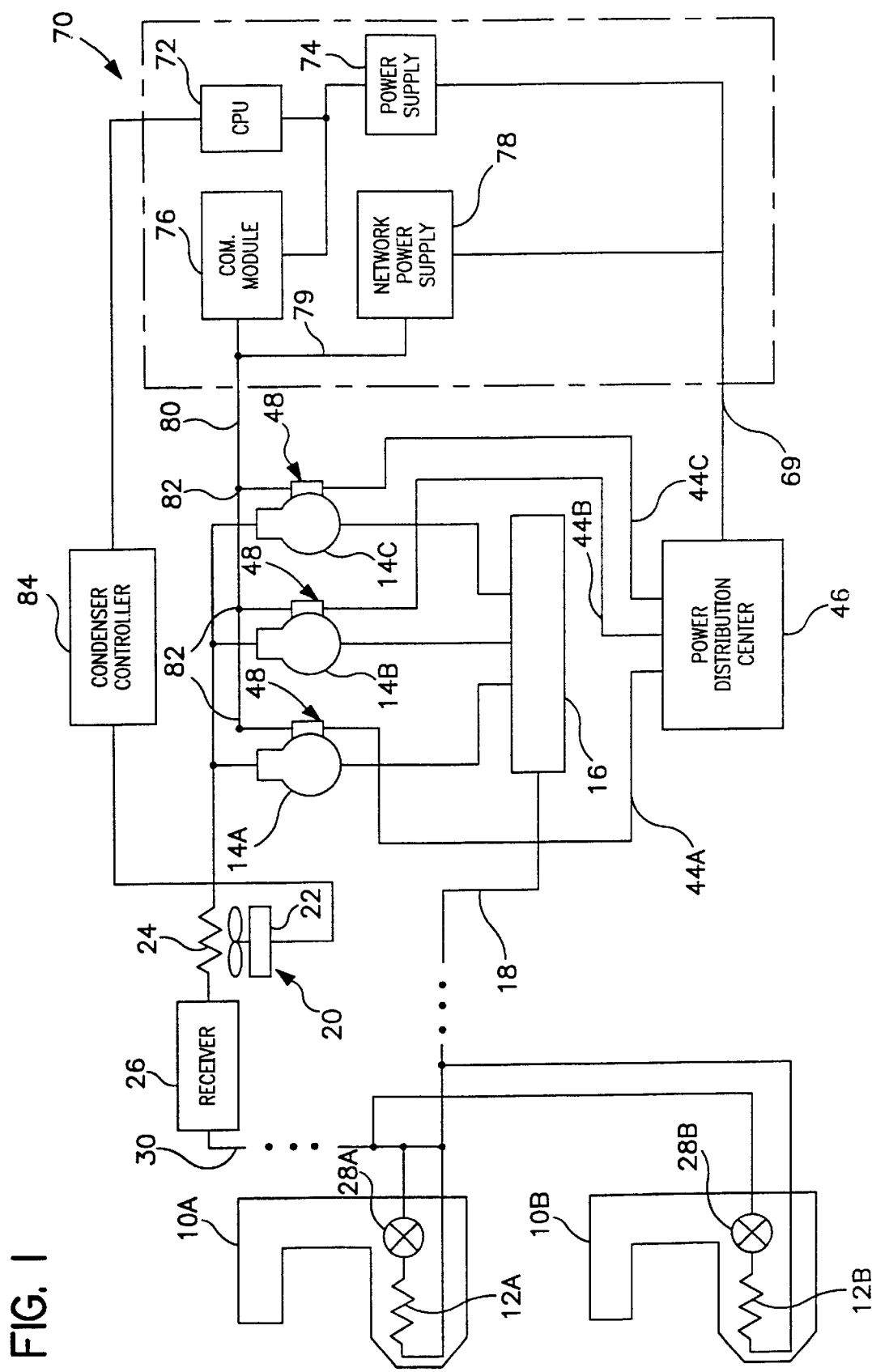
FIG. 1 is a schematic representation of a refrigeration system of the present invention in a food store.

Referring now to FIG. 1, a commercial refrigeration system for use in a food store is shown to comprise one or more fixtures which are illustrated as food display merchandisers 10A, 10B in the shopping arena of a food store.

The merchandisers 10A, 10B each incorporate at least one evaporator coil 12A, 12B (or like heat exchanger unit) disposed for cooling the merchandiser. Three multiplexed compressors (designated 14A, 14B, 14C, respectively) are connected by way of a suction header 16 and a low side return pipe 18 in fluid communication with the low side of the evaporators 12A, 12B for drawing refrigerant away from the evaporators. A condenser (generally indicated at 20) including a fan 22 and heat exchanger 24 is in fluid communication on the high discharge side of the compressors 14A, 14B, 14C for removing heat and condensing refrigerant pressurized by the compressors. Although an air-cooled condenser 20 is shown, other types of condensers, such as those liquid cooled from a ground source water supply, may be used without departing from the scope of the present invention.

Refrigerant from the condenser 20 is conventionally stored in a receiver 26 in communication with expansion valves 28A, 28B by way of a high side liquid delivery line 30. The expansion valves 28A, 28B meter refrigerant into respective evaporators 12A, 12B and induce a pressure drop for absorbing heat, to complete the refrigeration circuit. The compressors 14A, 14B, 14C and usually also the suction header 16 and receiver 26 are mounted on a compressor (i.e., condensing unit) rack (not shown) prior to shipment to the store location where the refrigeration system is to be installed.

The food display merchandisers 10A, 10B illustrated with the evaporators 12A, 12B would be placed in the shopping arena of a food store. However, it is understood that other types of cooling fixtures could be placed in other parts of the store (e.g., a service area or back room cooler). The liquid line 30 and suction return line 18 have been broken to indicate connection to other evaporators (not shown) in the system. Evaporators may be connected to the same piping circuit between the receiver 26 and the suction header 16, or in a different circuit or "branch" (not shown) connected to the receiver. Further, the number of compressors 14 in the refrigeration system may be more or less than three (including only a single compressor) without departing from the scope of the present invention. The refrigeration system must include a compressor, a condenser, an expansion valve and an evaporator. Other components are preferably included but are not essential, and the precise mounting or location of the system components may be other than described without departing from the scope of the present invention. Moreover, the present invention has application outside the food store environment for cooling other perishable, non-food products such as blood, plasma and medical supplies.

Figure 3:
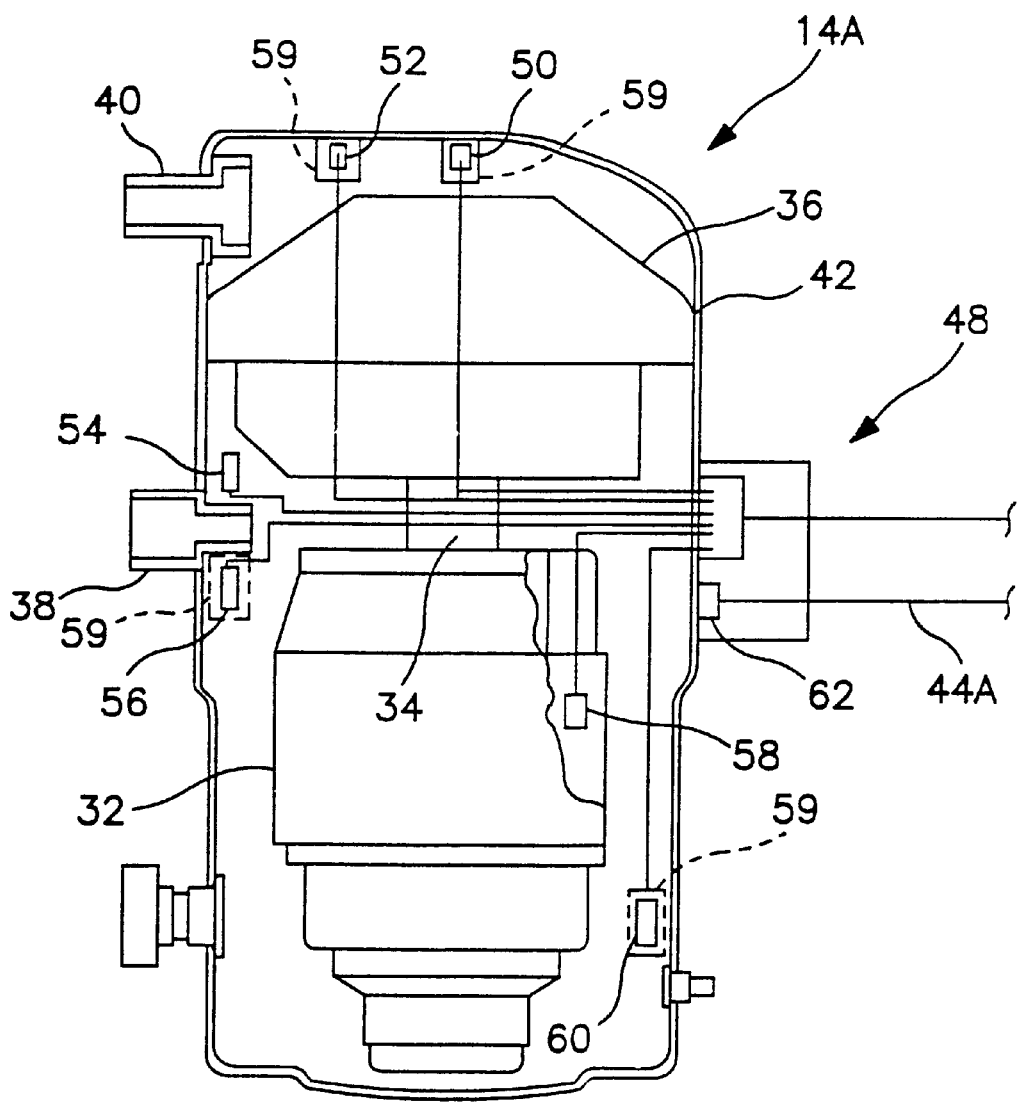
FIG. 3 is a schematic representation of a compressor of the present invention.

As shown in FIG. 3, each compressor 14A, 14B, 14C comprises an electric motor 32 driving a shaft 34 connected to a pressurizing unit 36. For purposes of the description herein, compressor 14A will be referred to, the other compressors 14B, 14C preferably having the same construction. The pressurizing unit may take on any suitable form. Typically, reciprocating pistons driven by a motor constitute the pressurizing device, but more and more, the quieter rotary devices found in scroll compressors and screw compressors are being employed to compress the vaporous refrigerant. A scroll compressor is illustrated in FIG. 3. The compressor 14A has a low side suction inlet 38 which receives the vaporous refrigerant from the evaporators 12A, 12B and a high side discharge outlet 40 through which hot, pressurized refrigerant is discharged from the compressor. The motor 32 and pressurizing unit 36 are preferably semi-hermetically or hermetically sealed within an outer casing or shell 42. The motors 32 of the compressors (FIG. 1) are each connected to a respective high voltage (e.g., three phase 480V AC or 208V AC) power line 44A, 44B, 44C extending from a power distribution center 46 within the food store. These lines are shielded, such as by placement within a conduit, as is required by electrical codes.

The compressors 14A, 14B, 14C each have a bus compatible compressor safety and control module 48 (broadly, "compressor operating unit") for monitoring at least one, but preferably several operating conditions or parameters of the compressor. The "operating parameters" in the preferred embodiment include (1) control parameters providing information used for controlling activation of the compressor 14, and (2) safety parameters providing information about whether the compressor is operating within its designed operational envelope or in a manner which could damage the compressor. It is envisioned that any number of parameters could be monitored, including only safety parameters or, less likely, only control parameters. Control parameters may include suction temperature, suction pressure and discharge pressure. Safety parameters usually include at least discharge pressure, oil level (or pressure), phase loss/reversal and motor winding temperature. However, the safety parameters preferably also include discharge temperature. As is apparent, some of the control parameters are also classified as safety parameters.

The bus compatible compressor safety and control module 48 (hereinafter, "BCCSCM") is constructed and arranged to detect the various operating parameters and control operation of the compressor. In the preferred embodiment, the BCCSCM comprises a processor 49 and multiple sensors in electronic communication with the processor. In the illustrated embodiment (FIG. 3), the compressor 14A is built with individual continuous reading analog sensors including a discharge pressure sensor 50, a discharge temperature sensor 52, a suction pressure sensor 54, a suction temperature sensor 56 and a motor winding temperature sensor 58 (FIG. 3). The temperature sensors 52, 56, 58 are variable resistance, RTD-type sensors. An oil level sensor 60 is of the type which changes the state of a circuit when the oil level falls below a predetermined minimum, and does not provide a continuous reading of the oil level. A power phase monitoring device 62 incorporated into the BCCSCM is capable of detecting both phase loss and phase reversal on the three phase power line 44A coming into the compressor 14A. It is to be understood that other sensors may be used without departing from the scope of the present invention.

An important feature of this invention is that the sensors 50–62 are preferably installed at the compressor assembly site and disposed within the hermetically (or semi-hermetically) sealed shell 42 of the compressor (FIG. 3). This construction is preferred because the sensors are protected in the shell and, particularly in the case of the suction pressure sensor 54, are located close to the pressurizing unit 36 for more accurate readings of compressor function. However, it is to be understood that the sensors 50–62 could be located other than in the shell 42 without departing from the scope of the present invention. For instance, it is envisioned that sensors could be replaceably received in openings in the shell 59 (schematically illustrated in phantom in FIG. 3) accessible from the exterior, or external to the compressor shell as in the case of a reciprocating semi-hermetic compressor, or any other motor driven compression device.

Figure 2:
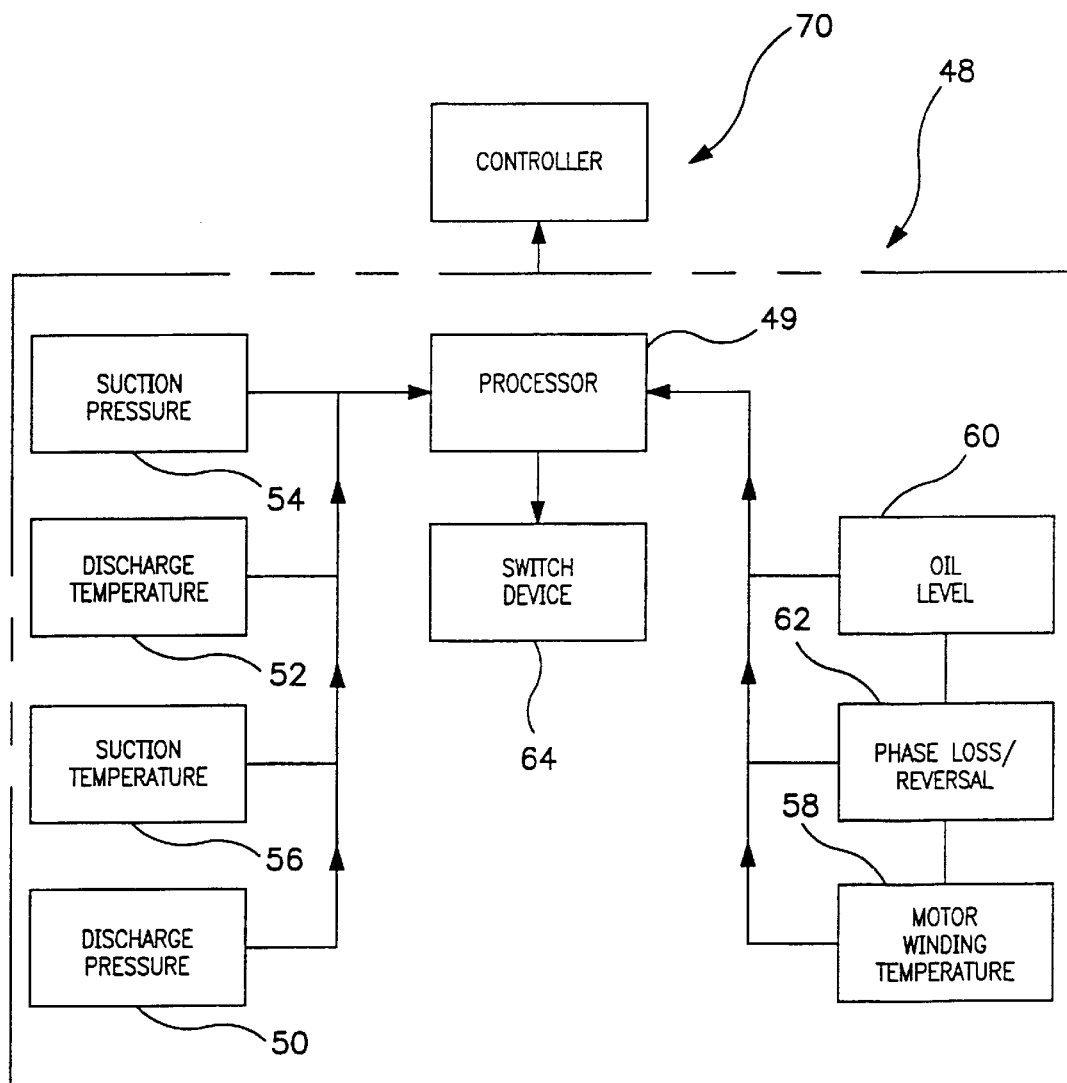
FIG. 2 is a schematic representation of a bus compatible compressor safety and control module of the present invention.

The processor 49 of the BCCSCM 48 in the preferred embodiment is a dual processor system, including a host microcontroller and a communication slave processor. The microcontroller and communications slave are not separately represented in FIG. 2, but are collectively represented as the processor 49. The host microcontroller preferably has a 256 byte internal RAM, 8 kilobytes of flash program memory, and 16 input/output pins for control interface. The communication slave is an application specific integrated circuit (ASIC) for the field bus network described below. The communication slave translates the protocol of the field network into a signal understood by the host microcontroller, and vice versa. The microcontroller is adapted to receive a signal from the sensor indicative of the value of the measured operating parameter at the time a reading is taken. The microcontroller also stores safety limit values for the measured safety parameters. The microcontroller is capable of generating a digital status information signal indicative of the values of the operating parameters. When a safety limit is traversed, the microcontroller is capable of generating a digital status information signal including specific information as to which safety parameter is out of specification. These signals are translated by the communication slave for sending over the field bus network.

The BCCSCM 48 for each compressor further includes a switch device 64, which is preferably a two pole solid state relay such as SSRD Series panel mount heavy duty solid state AC relay. The SSRD Series is made by Teledyne, Inc. of Los Angeles, Calif. and available from Allied Electronics of O'Fallon, Mo. The relay operates, upon receiving a command from the processor 49, to block two of the three phases of the electrical power to the compressor motor 32, thereby turning the motor off. It is to be understood that other switch devices may be used without departing from the scope of the present invention. The processor 49 is programmed to cause the relays to turn off the compressor (14A) when a safety limit value of one of the safety parameters is traversed.

A master controller 70 for controlling all of the compressors 14A, 14B, 14C of the refrigeration system is in electronic communication with all of the BCCSCM's 48 of the refrigeration system via line 80. The controller includes a CPU 72 which coordinates data transfer among the components of the system. The CPU 72 also processes data acquired from the BCCSCM's 48 and determines control commands to be sent to the BCCSCM's. In the preferred embodiment, the CPU 72 includes a 16 bit RISC processor, has 64 kilobytes of read only memory (ROM) and 16 kilobytes of random access memory (RAM). A real time clock is needed for the CPU 72 to perform time-based control functions. Moreover, the CPU 72 preferably has at least two serial interfaces to permit connection to a local human-machine interface (hereinafter, "HMI"), as well as a remote interface. The CPU 72 has both digital and analog inputs and outputs, and is powered by a 24V DC power supply 74 transformed and rectified from a 120V AC feed line 69.

The controller 70 further includes a communications module 76 (COM. MODULE) to permit the CPU 72 to work with a field bus networking system. The field bus networking system is designed to connect sensors, actuators and other control equipment at the field level. An example of a suitable field bus networking system is the AS-Interface® (or AS-i) networking system. Components for the AS-i network are sold commercially by Siemens Aktiengesellschaft of Germany, and available in the United States from Siemens Energy Automation and Control, Inc. of Batavia, Ill. The communications module 76 is powered by the same 24V power supply 74 used by the CPU 72. However, the field bus network operates on a separate 24V–30V DC power supply 78 (NETWORK POWER SUPPLY) connected to a 120V AC feed line 69. The field bus network further includes an unshielded two wire bus 80 connecting the communications module 76 (and hence the CPU 72) to all of the BCCSCM's. One wire is a ground wire and the other is a communication and power line which carries all communication and power for the BCCSCM's 48. Power for the BCCSCM's is supplied from the network power supply 78 through line 79, which has a communications decoupling feature allowing communications and power to be supplied over the same line. The BCCSCM's 48 are each connected to the bus 80 at nodes 82 by a respective coupling (not shown) which penetrates insulation of the bus cable and makes contact with the wires. Each BCCSCM 48 is plugged into the coupling to connect the control and safety module to the network.

The master controller 70 also controls cycling of the condenser fans 22. However, in the illustrated embodiment, the master controller 70 transmits these cycling commands from the CPU 72 to a separate condenser controller 84 located close to the fans 22. The condenser controller 84 executes the commands for shutting down or energizing the condenser fans 22. The condenser controller 84 can have its own field bus network for the condenser fans, just like the network of the compressors 14A, 14B, 14C with the master controller 70. Other condenser control arrangements may be used without departing from the scope of the present invention. For instance, the condenser controller 84 could be eliminated and its functions programmed into the master controller.

Figure 4:
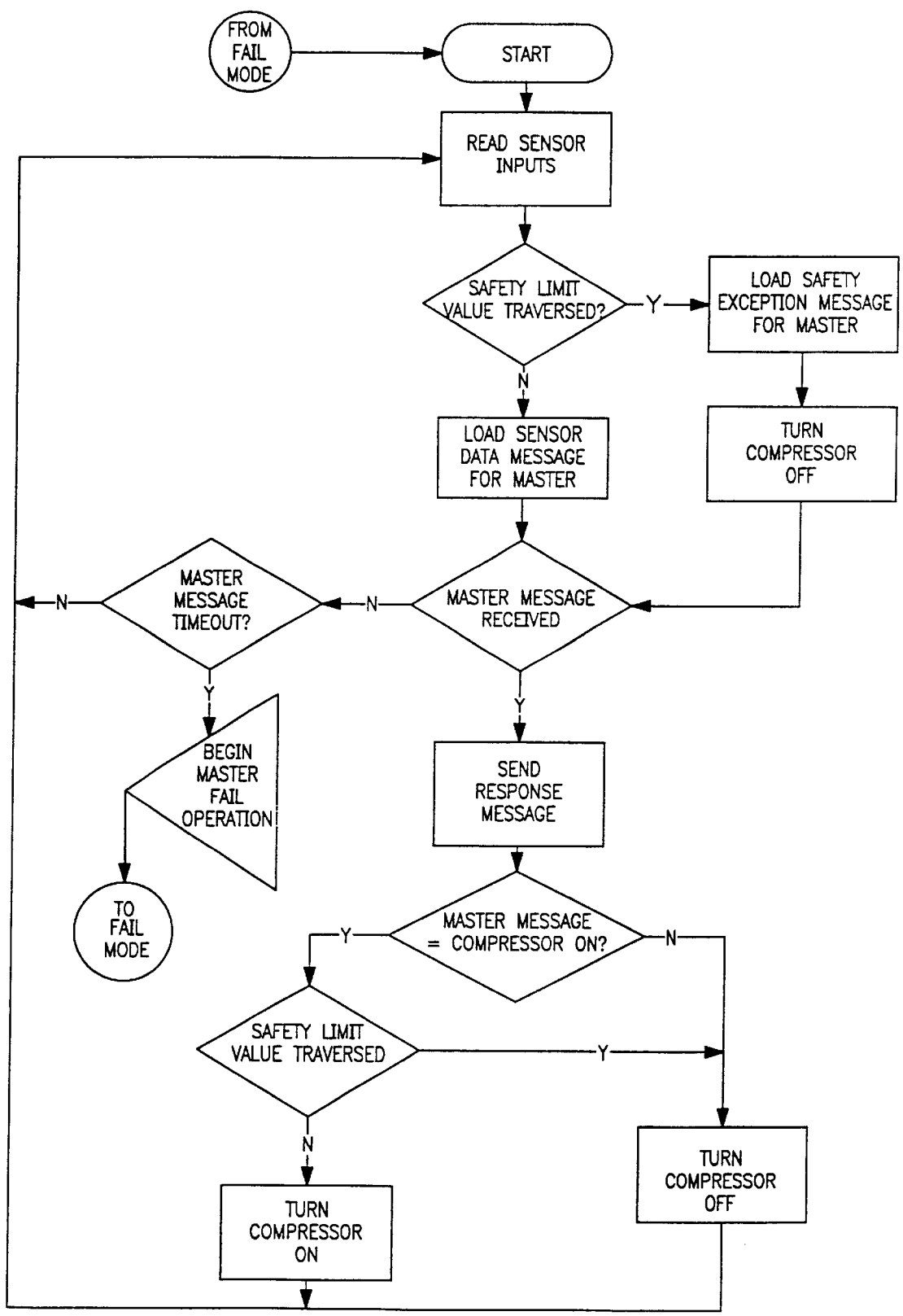
FIG. 4 is a flow diagram illustrating operation of the control and safety module in a standard operating mode.

Referring now to FIG. 4, in standard operation, the sensors 50–62 of each BCCSCM 48 (e.g., the BCCSCM associated with compressor 14A) provide information regarding the operating parameters monitored by the sensors and these are read in a first operation of the BCCSCM processor 49. The information provided by the sensors 50–62 could be limited to whether or not a pre-set safety limit value has been traversed. However, preferably at least some of the sensors would provide signals to the processor 49 of each BCCSCM 48 indicative of the actual value of the operating parameter at the time sampled. In a preferred embodiment, the sensors for discharge pressure (50) and temperature (52), suction pressure (54) and temperature (56) and motor winding temperature (58) provide an analog signal to the processor 49 indicative of the actual value of the parameter measured. The oil level sensor 60 and power phase monitoring device 62 provide a circuit open or circuit closed signal to the microcontroller indicative only of whether the oil level safety limit value has been traversed, or whether phase loss or phase reversal has occurred.

The processor 49 of each BCCSCM 48 checks the inputs from each sensor to determine whether a safety limit value for any of the measured compressor characteristics has been exceeded. If no safety limit values are exceeded, the processor 49 loads the sensor data for transmission to the master controller 70 when the processor is queried. The master controller 70 is the master network controller in standard operation of the system. In the illustrated embodiment, the microcontroller of the processor 49 stacks the information in its communication slave to await transmission to the master controller 70. The processor 49 then waits for a message from the master 70 containing commands and a query for the sensor data. As soon as the message is received, the processor 49 responds over the communication and power line of the two wire bus 80 to the controller 70 with the information data stored from the sensors 50–62.

Data from all of the processors 49 flows in a stream over the communication and power line of the bus 80 to the communication module 76 and thence to the CPU 72 of the rack master controller 70. The communication protocol allows the CPU 72 to associate the operating parameter information received with particular compressors, and to discriminate between different operating parameters for each compressor. More specifically, each BCCSCM 48 is assigned a particular address, which allows the controller 70 to communicate individually with each of the BCCSCM's over the same line, and also allows the BCCSCM processors 49 to identify themselves to the master controller.

The data is now available through interfacing with the rack master controller 70, either remotely or by a local human machine interface, to view individual compressor data. The processor 49 also looks for the command portion of the master controller message for a command to turn the compressor (14A, 14B or 14C) on or off. If such a command is present, the processor 49 executes it by operating the solid state relay (switch device 64) to turn the compressor on or off. However, if the command is to turn the compressor on, the processor 49 will not execute it if the processor has previously determined that a safety limit value of one of the safety parameters has been traversed. It is envisioned that other capacity control commands could be received and executed by the processor such as when the compressor was of a variable capacity type. The software of the processor 49 then returns to the initial step of reading the sensor inputs.

However, when one or more of the inputs from the sensors 50–62 to the processor 49 traverses a safety limit value, the processor loads a safety exception message for the rack master controller 70 and immediately shuts down the compressor (e.g., compressor 14B). The safety exception message is loaded into the communication slave of the processor 49 at the top of the stack of information to be sent to the master controller. When the processor 49 receives a message from the master controller 70, it responds by including the safety exception message for the controller. The controller 70 will know not only that one of the safety limit values for a particular compressor was traversed, but which safety parameter or parameters were traversed and in most instances the actual values of those parameters. An alarm can be activated by the controller to alert the appropriate persons that a problem exists. The information can be accessed by a technician via a suitable HMI in the system (located, for example, at the controller 70), or remotely such as through an Internet connection. Thus, the technician is able to know immediately the nature of the problem for more efficient troubleshooting. The information regarding the operating parameters of the properly functioning compressors (e.g., 14A, 14C) can also be accessed in this manner.

The master controller 70 will also receive information concerning control parameters of the compressors 14A, 14B, 14C. A primary control parameter is suction pressure. The controller 70 is programmed so that it manipulates (e.g., such as by averaging) the suction pressure readings from the BCCSCM's 48 to determine the refrigeration level produced by the multiplexed compressors 14A, 14B, 14C. The controller 70 uses this information to strategize cycling compressors in the system to achieve the desired refrigeration capacity level. Other control parameters such as suction temperature, discharge temperature and discharge pressure are also used by the controller to control the system. For instance, the suction temperature readings may be used to adjust electronic expansion valves (not shown). The controller is configured to ignore in its calculations of collective suction pressure any compressor which is turned off or which has an anomalous suction pressure reading.

Figure 5:
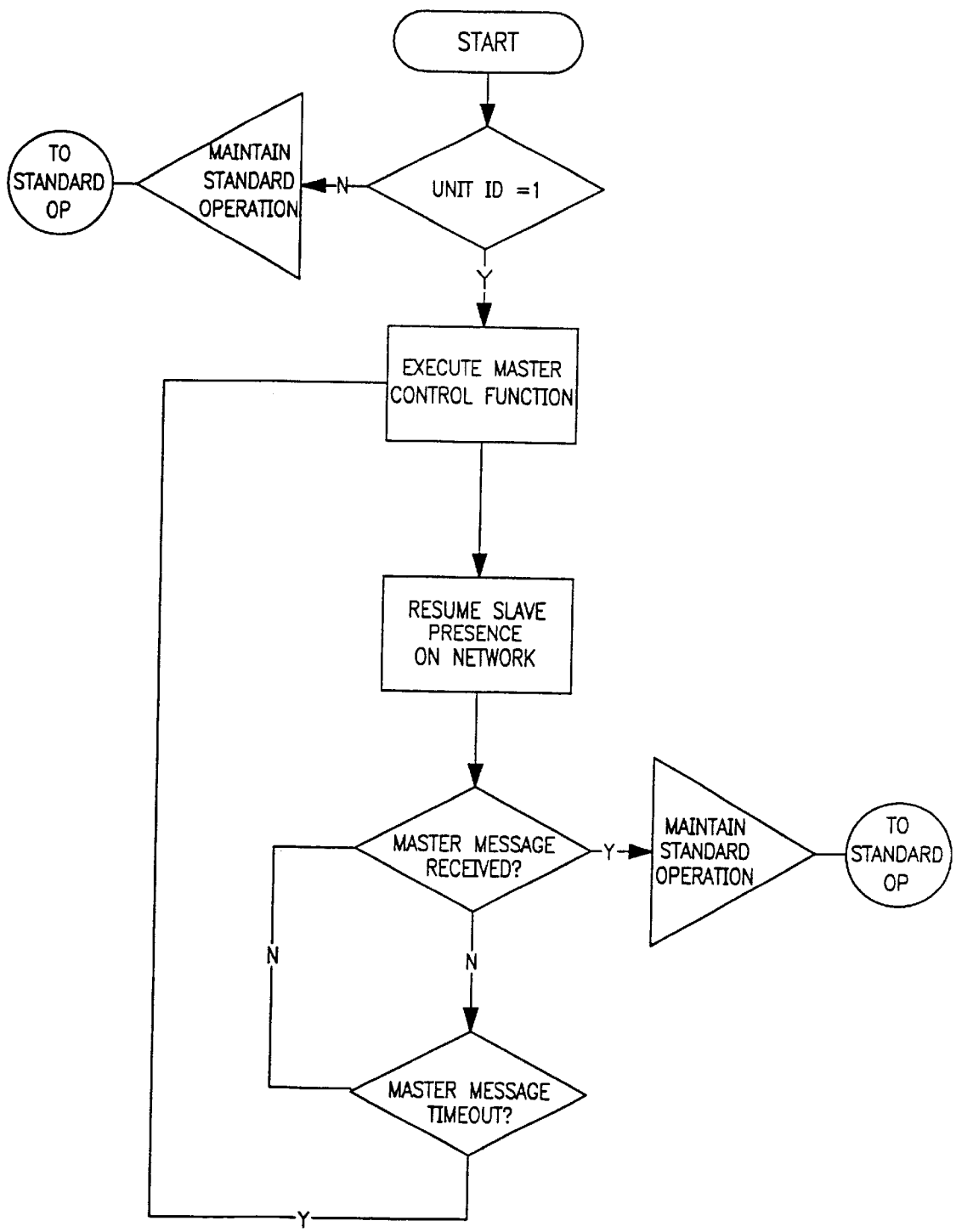
FIG. 5 is a flow diagram illustrating operation of the control and safety module in a master controller failure mode.

An important feature of the invention is that should the master controller 70 (and in particular the CPU 72) fail, the BCCSCM's 48 are capable of performing the controller functions for the compressors 14A, 14B, 14C. A flow chart of the operation of the processors 49 in the master fail mode is shown in FIG. 5. As stated above with reference to FIG. 4, the processor 49 of each BCCSCM 48 waits a predetermined time period for a message from the master controller 70. If the period times out with no message, the processor 49 defaults to a master fail operation mode. The processors of the other compressors will opt to this mode as well. The BCCSCM's 48 communicate with each other over the communication and power line of the bus 80, in addition to communicating with the controller 70. In the failure mode, each processor 49 determines whether it is to have primary control. One BCCSCM's processor 49 will have previously been programmed with a certain identification or address, e.g., ID=1. Typically, this would be the BCCSCM 48 of the first compressor 14A in the system. Any BCCSCM not having this identification will continue to operate only responsively to commands received over the field bus network (i.e., it resumes standard operation as a slave). It is also envisioned that the slave processors 49 (i.e., processors associated with compressors 14B, 14C) would start a second timer once entering the failure mode to look for a message from the processor of the BCCSCM 48 designated for primary system control in the failure mode (i.e., the processor associated with compressor 14A). If the other processors do not receive such a message, a second BCCSCM 48 would be pre-selected (e.g., the BCCSCM having ID=2 associated with compressor 14B) to control the operation of the system in the failure mode. Thus, the system is highly granular, allowing for multiple failure while maintaining operation.

For disclosure purposes, the processor 49 of the BCCSCM 48 of compressor 14A is identified as the primary control or master, in case of failure of the master controller 70, and will execute a master control function involving at least basic compressor cycling. In that regard, the primary control processor 49 is capable of determining the collective suction pressure of the operating compressors 14A, 14B, 14C and providing control commands for itself and the other slave processors to turn compressors on and off to maintain the refrigeration capacity requirements of the system. After performing this function, the "primary" processor 49 resumes a slave presence on the network which allows it to again look for a message from the master controller 70 for a period of time before returning again to perform a system control function. Once the master controller 70 is detected, the primary control processor 49 returns to its standard (slave) mode of operation.

The distributed intelligence control for commercial refrigeration achieves objects of ease of assembly and installation, and enhanced control. The compressors 14A, 14B, 14C of the present invention are configured with one or more sensors (50–62) to optimize uniformity of measurement of operation parameters and to minimize installation variances as well as provide protection of such sensor devices. The modularity of the BCCSCM of each compressor and its intelligence interface with the master controller 70 to assure optimum compressor performance, as well as granularity of the system.

Assembly of a refrigeration system is made easier by simplification of the wiring which must be done upon installation. The high voltage lines 44A, 44B, 44C must still be run to the compressors 14A, 14B, 14C for primary operation, according to electrical codes, it will be necessary to shield these lines such as by placing them in conduit. However, no separate power lines other than three phase high voltage lines (44) must be run to the compressor motors 32, and it is unnecessary to run additional high voltage lines to the BCCSCM's. Instead, a single high voltage feed line 69 supplies the power supply 74 for the CPU 72 and communication module 76 and also the network power supply 78.

Power for all of the BCCSCM's 48 is supplied through the same two wire bus 80 extending from the communications module 76 to the control and safety modules 48. The bus 80 does not need to be shielded because it carries only 30VDC power. Preferably, the wiring of the BCCSCM's 48 to the master controller 70 is done at the factory where the compressors 14A, 14B, 14C are mounted together with the controller on a compressor rack (not shown) so that no power wiring of any kind for the BCCSCM's is required at the building site. The number of BCCSCM's 48 attached to the bus 80 up to some upper limit of the controller 70 (e.g., 31) is immaterial and requires no special re-configuration of the controller.

As stated above, the connection of the BCCSCM's 48 to the communication bus 80 achieves not only power, but communications for the control and safety modules. No separate feedback wiring from the individual sensors is necessary. The BCCSCM processor 49 executes commands from the master controller 70 and is capable of reporting back to the controller that the command has been executed. The processor 49 reports the readings from all of the sensors 50–58, and not only whether a safety limit value has been exceeded, but exactly which one it is. This enables the master controller 70 to provide specific information to a repair technician without any additional wiring between the controller and the BCCSCM 48. In addition to permitting refrigeration level control by the controller 70, this allows the controller to make other adjustments in the system and to monitor trends for use in failure prediction.

The processors 49 of the BCCSCM's 48 also preferably have the embedded intelligence to operate the refrigeration system in case the master controller 70 fails. In that regard, the BCCSCM's 48 are capable of communicating with each other as well as the master controller 70 over the two wire bus 80. In case of failure of the master controller, one of the BCCSCM's 48 will take over as master or "primary" and can perform at least the function of averaging the measured suction pressure readings from the operating compressors to determine refrigeration level and determine how to cycle the compressors to maintain a predetermined capacity.

It is to be understood that the foregoing description and accompanying drawing have been given only by way of illustration and example, and that changes and modifications in the present disclosure, which will be readily apparent to all skilled in the art, are contemplated as within the scope of the present invention, which is limited only by the scope of the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

What is claimed is:

1. A commercial refrigeration system for use in a food store comprising:

an evaporator constructed and arranged for cooling food;

a compressor in fluid communication with the evaporator for drawing refrigerant away from the evaporator;

a condenser in fluid communication with the compressor for receiving refrigerant from the compressor, the condenser being constructed and arranged for removing heat from the refrigerant;

an expansion valve in fluid communication with the condenser for receiving refrigerant from the condenser, the expansion valve being constructed and arranged for delivering refrigerant into the evaporator;

a controller for controlling the compressor;

a compressor operating unit associated with the compressor, the operating unit being constructed and arranged for executing commands from the controller to affect the operation of the compressor and for monitoring at least one operating parameter of the compressor and determining whether the operating parameter is within specification;

a low voltage power and communication line extending from the controller to the compressor operating unit and providing electrical power for the operating unit;

wherein the controller and compressor operating unit are constructed and arranged for digital communication over the low voltage power and communication line such that no separate power line for the operating unit must be wired upon installation of the system.

2. The refrigeration system of claim 1 wherein the operating unit comprises a processor and plural sensors in electronic communication with the processor to monitor multiple operating parameters of the compressor.

3. The refrigeration system of claim 2 wherein the operating unit further comprises a switch device in electronic communication with the processor, the switch device being operable to turn the compressor off and on in response to commands from the processor.

4. The refrigeration system of claim 2 wherein the one operating parameter is a safety parameter indicative of whether the compressor is operating in a manner which could damage the compressor.

5. The refrigeration system in a food store as set forth in claim 4 wherein the sensors are constructed and arranged to detect multiple safety parameters for compressor operation, and wherein the processor is configured to activate an alarm when any safety parameter indicates that the compressor is operating in a manner which could damage the compressor.

6. The refrigeration system of claim 1 wherein the one operating parameters is control parameter indicative of the refrigeration load capacity produced by the compressor.

7. The refrigeration system of claim 2 wherein the processor is operable to communicate digital data regarding the operating parameters to the controller.

8. The refrigeration system of claim 3 wherein the processor is configured to operate in a standard operating mode and a controller failure mode, wherein in the standard operating mode the processor receives commands from the controller for operation of the switch device and sends corresponding commands to the switch device.

9. The refrigeration system of claim 8 wherein in the controller failure mode the processor detects that the controller is not functioning and assumes a primary controller function to cycle the compressor through operation of the switch device to maintain normal refrigeration functions.

10. The refrigeration system of claim 1 wherein there are multiple compressors and a compressor operating unit associated with each compressor, each compressor operating unit being powered by and in electronic communication with the controller over the power and communication line.

11. The refrigeration system of claim 10 wherein each of the compressor operating units is constructed and arranged for communicating with the other compressor operating units over the power and communication line.

12. The refrigeration system of claim 11 wherein all compressor operating units are operable in a standard operating mode and in a controller failure mode, wherein in the standard operation mode the compressor is operated in response to commands from the controller.

13. The refrigeration system of claim 12 wherein in the controller failure mode the operating units control the compressors based on the detected operating parameters to maintain a normal refrigeration function independently of the controller.

14. The refrigeration system of claim 11 wherein the operating units are operable to send digital data regarding the operating parameters to the controller, and wherein the controller is configured to determine the operating demands for maintaining a refrigeration level to send to each of the operating units based on the operating parameter information received.

15. The refrigeration system of claim 14 wherein the operating parameters include control parameters indicative of the refrigeration produced by each compressor, and at least one of the sensors of each operating unit being constructed and arranged for detecting one of the control parameters.

16. The refrigeration system of claim 15 wherein the controller is configured to determine whether any of the control parameters received from the operating units should be ignored in determining operating commands.

17. In combination, a food store refrigeration system comprising at least one fixture having evaporator means for cooling the fixture, compressor means having its suction side connected to draw refrigerant vapor from the evaporator means, condenser means connected to the compressor discharge side for receiving high pressure refrigerant from the compressor means and being operative for liquefying the refrigerant, and other means constructed and arranged for delivering refrigerant into the evaporator means, and controller means for controlling, in use, the operation of the compressor means, said controller means comprising:

a compressor control and safety module operatively associated, in use, between the compressor means and the controller means, the compressor control and safety module being constructed and arranged for monitoring at least one operating condition of the compressor means and determining whether it is within a prescribed operating parameter;

a low voltage power and communication line extending from the controller means to the compressor control and safety module and providing electrical power therefor, and wherein the controller means and compressor control and safety module are constructed and arranged for digital communication through said low voltage power and communication line whereby no separate power line for the compressor or compressor control and safety module must be used upon installation of the system.

18. A commercial refrigeration compressor for use in a vapor phase refrigeration system having evaporative cooling means for refrigerating perishable products, the compressor comprising an outer casing, an electric motor, a pressurizing unit constructed and arranged within the casing to be driven, in use, by the motor for drawing vaporous refrigerant from the cooling means at low pressure and pressurizing the vaporous refrigerant to a higher pressure, and an operating unit including a processor, at least one sensor strategically placed within the casing for monitoring an operating parameter of the compressor and being in communication with the processor, switching means connected to the processor for controlling activation and deactivation of the motor, the processor being configured for transmitting data regarding the sensed operating parameter to a master controller remote from the compressor and for receiving compressor control commands from such master controller and for executing such commands.

19. A refrigeration compressor as set forth in claim 18 wherein the processor is configured to detect failure of the master controller and to control said switching means based on operating parameters detected by the sensors and a refrigeration level value stored in the processor to maintain a predetermined refrigeration level.

20. A commercial refrigeration compressor as set forth in claim 19 wherein the processor is configured to communicate operating parameters and control commands with other processors of operating units of other compressors.

21. A commercial refrigeration compressor as set forth in claim 20 wherein the operating parameters include at least one control parameter indicative of the level of refrigeration produced by the compressor and safety parameters indicative of whether the compressor is operating in a manner which could damage the compressor, the operating unit comprising sensors for detecting safety parameters and sensors for detecting control parameters, all sensors of the compressor detecting operating parameters being in electronic communication with the processor.

22. A commercial refrigeration compressor as set forth in claim 21 wherein the control parameter is selected from a group including suction pressure of the compressor and discharge pressure of the compressor, and wherein the safety parameters are selected from a group including oil level, phase loss, phase reversal, motor winding temperature, discharge temperature, discharge pressure and suction pressure.

23. A commercial refrigeration compressor as set forth in claim 22 wherein the compressor further comprises one of a semi-hermetically sealed shell and a hermetically sealed shell, and wherein the motor, pressurizing unit and sensors are disposed within the shell.

24. A commercial refrigeration compressor as set forth in claim 22 wherein the processor is configured to communicate an alarm activation condition to the master controller upon detection of a safety parameter indicating the compressor is operating in a manner which could damage the compressor.

25. A commercial refrigeration compressor as set forth in claim 18 in combination with at least one other compressor of the same construction.

26. The combination as set forth in claim 25 further including the master controller, and a single power and communication line extending between the master controller and the operating units of the compressors, the power and communication line being constructed and arranged for conducting electrical power to the operating units and for conducting communication between the operating units and the master controller.

27. A refrigeration compressor for use in a vapor phase refrigeration system having evaporative cooling means for refrigerating perishable products, the compressor comprising an outer casing, an electric motor, a pressurizing unit constructed and arranged within the casing to be driven, in use, by the motor for drawing vaporous refrigerant from the cooling means at low pressure and pressurizing the vaporous refrigerant to a higher pressure, and an operating unit including a processor, at least one sensor strategically placed within the casing for monitoring an operating parameter of the compressor and being in communication with the processor, switch means connected to the processor for controlling activation and deactivation of the motor, the processor being constructed and arranged to command the switch means in response to a control evaluation of the sensed operating parameter.

28. The refrigeration compressor of claim 27 which includes a master controller receiving sensed data of operating parameters from the processor, and sends control signals to the processor in a normal operational mode.

29. The refrigeration compressor of claim 28 wherein the processor is configured to detect failure of the master controller and to control said switch means based on its independent evaluation of the operating parameters detected by the sensors and a refrigeration level value stored in the processor whereby to maintain a predetermined refrigeration level.

30. The compressor of claim 29 wherein the processor is configured to communicate operating parameters and control commands with other compressor operating units in the same refrigeration system.

31. The refrigeration compressor of claim 30 wherein the operating parameters include at least one control parameter indicative of the level of refrigeration produced by the compressor, and at least one safety parameter indicative of whether the compressor is operating within predetermined safety limits, the operating unit comprising sensors for detecting safety parameters and sensors for detecting control parameters, all sensors of the compressor detecting operating parameters being in electronic communication with the processor.

32. The refrigeration compressor of claim 31 wherein a control parameter is selected from a group including compressor suction pressure and compressor discharge pressure, and wherein a safety parameter is selected from a group including oil failure, phase loss, phase reversal, motor winding temperature, compressor discharge temperature and compressor suction pressure.

33. The refrigeration compressor of claim 32 wherein the compressor further comprises one of a semi-hermetically sealed shell and a hermetically sealed shell, and wherein the motor, pressurizing unit and sensors are disposed within the shell.

34. A commercial refrigeration compressor as set forth in claim 32 wherein the processor is configured to communicate an alarm activation condition to the master controller upon detection of a safety parameter indicating the compressor is operating outside the prescribed safety limits.

35. A commercial refrigeration compressor for use in a commercial refrigeration system of the type used to refrigerate perishable products, the compressor comprising a hermetically sealed shell, an electric motor disposed in the shell, a pressurizing unit connected to the electric motor and disposed in the shell, the pressurizing unit having an inlet and an outlet, the pressurizing unit being constructed and arranged for drawing in generally vaporous refrigerant at low pressure in through the inlet, pressurizing the vaporous refrigerant to a higher pressure and discharging the pressurized refrigerant at said higher pressure out through the outlet, and an operating unit mounted on the pressurizing unit, the operating unit including a processor mounted on the compressor, a sensor disposed within the shell for detecting a control parameter of the compressor indicative of the level of refrigeration produced by the compressor, the sensor being in communication with the processor, a switch device connected to the processor for controlling activation and deactivation of the motor.

36. A commercial refrigeration compressor as set forth in claim 35 wherein operating unit comprises sensors disposed in the shell for detecting safety parameters indicative of whether the compressor is operating in a manner which could damage the compressor, the sensors being in electronic communication with the processor.

37. A commercial refrigeration compressor as set forth in claim 36 wherein the control parameter is selected from a group including suction pressure of the compressor and discharge pressure of the compressor, and wherein the safety parameters are selected from a group including oil failure, phase loss, phase reversal, motor winding temperature, discharge temperature, discharge pressure and suction pressure.

38. A commercial refrigeration compressor as set forth in claim 36 wherein the safety parameters and control parameters collectively define operating parameters of the compressor, all sensors detecting operating parameters of the compressor being hermetically sealed within the shell.

39. A commercial refrigeration compressor as set forth in claim 38 wherein the processor is configured to communicate an alarm activation condition to a controller remote from the compressor upon detection of a safety parameter indicating the compressor is operating in a manner which could damage the compressor.

40. A commercial refrigeration compressor as set forth in claim 38 wherein the processor is configured to communicate information concerning the operating parameters to a controller remote from the compressor.

41. A commercial refrigeration compressor as set forth in claim 40 wherein the processor is configured to detect failure of the controller and to control the switch device based on operating parameters detected by the sensors to maintain a predetermined refrigeration level.

42. A commercial refrigeration compressor as set forth in claim 40 wherein the processor is configured to communicate operating parameters and control commands with other processors of operating units of other compressors.

43. A commercial refrigeration compressor as set forth in claim 35 in combination with at least one other compressor of the same construction.

44. The combination as set forth in claim 43 further including a controller mounted remotely from the compressors, and a single power and communication line extending between the controller and the operating units of the compressors, the power and communication line being constructed and arranged for conducting electrical power to the operating units and for conducting digital communication between the operating units and the controller.

45. In combination a refrigeration system compressor having an operating unit and plural sensors, and a master controller electronically connected to the operating unit, the operating unit comprising:

means for establishing a sensed digital signal representing the value of a refrigerant operating parameter;

means for holding the operating unit in a standard operation mode awaiting command signals from the master controller during a preset time period;

means for transmitting the digital signal to the master controller upon request therefrom and executing any command signal, if received, to change the refrigerating capacity of the compressor as dictated by the command signal;

means for switching the operating unit into a master controller failure mode if no command signal is received within the preset time period;

means for evaluating the sensed signal within the operating unit while in the failure mode and assuming independent control of the compressor to change the refrigeration capacity thereof, and means for setting sequential time periods for the master controller to resume control.

46. A method of distributed intelligence control of a compressor in a refrigeration system having a plurality of fixtures, the compressor having a dedicated operating unit constructed and arranged to monitor at least two sensed operating parameters and being electronically dependent upon a master controller in a standard operation mode, the method comprising the steps of:

receiving sensed signals indicative of refrigerant conditions associated with the compressor into the operating unit;

converting at least one sensed signal to a digital signal representing the value of the refrigeration condition, and holding the operating unit in the standard operation mode for a preselected time period awaiting a command signal from the master controller;

transmitting the digital signal in the operating unit to the master controller in response to a command signal received therefrom within the preselected time period, and executing any command signal from the master controller to change the compressor operation;

assuming an independent control mode in the operating unit when the master controller is in a failure mode and sends no command signal to the operating unit within the preselected time period, and
(a) determining within the operating unit the required compressor operation responsive to the sensed signal and controlling the compressor operation accordingly,
(b) waiting another set period of time for a command signal from the master controller,
(c) repeating steps (a) and (b) if no command signal is received within said other set period of time.

47. The method of claim 46 in which the dedicated operating unit includes the step of (d) functioning in the absence of a controlling intelligence command signal from the master controller during any set period of time.

48. The method of claim 46 in which the dedicated operating unit includes the step of
(e) evaluating the sensed operating parameters to determine if preset safety operating limits for the compressor are traversed while in the standard operation mode, and
(f) taking command of the compressor to avert system damage.

49. The method of claim 46 in which the refrigeration system has multiplexed compressors, each having a dedicated operating unit monitoring operating parameters and including the steps of:
(g) providing a distributed intelligence control of each operating unit with the master controller during the standard operation mode, and
(h) providing independent control in one of said operating units when the master controller is in a failure mode and sends no command signal to the operating unit within the preselected time period, and
(i) receiving in said one operating unit information from the operating unit of each compressor, determining within said one operating unit the required compressor operation responsive to the sensed signal and controlling the operation of all compressors accordingly.

50. A commercial refrigeration compressor system for use in a food store comprising:

a compressor constructed and arranged for fluid communication with an evaporator for drawing refrigerant away from the evaporator, delivering the refrigerant to a condenser and forcing condensed refrigerant through an expansion valve back to the evaporator;

a controller for controlling the compressor;

a compressor operating unit associated with the compressor, the operating unit being constructed and arranged for executing commands from the controller to affect the operation of the compressor and for monitoring at least one operating parameter of the compressor and determining whether the operating parameter is within specification, the compressor operating unit being further constructed and arranged to operate the compressor in opposition to a contrary command from the controller if the operating parameter is not within specification;

a power and communication line extending from the controller to the compressor operating unit and providing electrical power for the operating unit;

wherein the controller and compressor operating unit are constructed and arranged for digital communication over the power and communication line such that no separate power line for the operating unit must be wired upon installation of the system.

51. A refrigeration system as set forth in claim 50 wherein the one operating parameter is a safety parameter indicative of whether the compressor is operating in a manner which could damage the compressor.

52. The refrigeration system in a food store as set forth in claim 51 wherein the compressor operating unit is constructed and arranged to detect multiple operating parameters of the compressor.

53. The refrigeration system of claim 52 wherein the operating parameters include at least one control parameter indicative of the load capacity produced by the compressor.

54. The refrigeration system of claim 53 wherein the compressor operating unit comprises a processor and plural sensors in electronic communication with the processor to monitor multiple operating parameters of the compressor.

55. The refrigeration system as set forth in claim 54 wherein the processor is operable to communicate to the controller digital data including the value of at least one of the operating parameters monitored by the sensors.

56. A method of distributed intelligence control of a controlled unit constituting part of a refrigeration system, the controlled unit having a dedicated operating unit constructed and arranged to monitor an operating parameter and being electronically dependent upon a master controller in a standard operation mode, the method comprising the steps of:

receiving a sensed signal indicative of a condition associated with the controlled unit into the operating unit;

converting the sensed signal to a digital signal representing the value of the condition, and holding the operating unit in the standard operation mode for a preselected time period awaiting a command signal from the master controller;

transmitting the digital signal in the operating unit to the master controller in response to a command signal received therefrom within the preselected time period, and executing any command signal from the master controller to change the controlled unit operation;

assuming an independent control mode in the operating unit when the master controller is in a failure mode and sends no command signal to the operating unit within the preselected time period, and
(a) determining within the operating unit the required controlled unit operation responsive to the sensed signal and controlling the controlled unit operation accordingly,
(b) waiting another set period of time for a command signal from the master controller,
(c) repeating steps (a) and (b) if no command signal is received within said other set period of time.

57. The method of claim 56 in which the refrigeration system has plural controlled units, each having a dedicated operating unit monitoring an operating parameter and including the steps of:
(d) providing a distributed intelligence control of each operating unit with the master controller during the standard operation mode, and
(e) providing independent control in one of said operating units when the master controller is in a failure mode and sends no command signal to the operating unit within the preselected time period, and
(f) receiving in said one operating unit information from the operating unit of each controlled unit, determining within said one operating unit the required controlled unit operation responsive to the sensed signal and controlling the operation of all controlled units accordingly.

* * * * *